US010699335B2

(12) United States Patent
Yuan et al.

(10) Patent No.: US 10,699,335 B2
(45) Date of Patent: Jun. 30, 2020

(54) APPARATUS AND METHOD FOR TOTAL LOSS PREDICTION

(71) Applicant: THE DUN & BRADSTREET CORPORATION, Short Hills, NJ (US)

(72) Inventors: Xin Yuan, Basking Ridge, NJ (US); Paul Douglas Ballew, Madison, NJ (US); Nipa Basu, Bridgewater, NJ (US); Jianjing Ling, Brighton, MA (US); Kathleen Wachholz, Nazareth, PA (US); Alla Kramskaia, Edison, NJ (US); Brian Scott Crigler, Westfield, NJ (US)

(73) Assignee: THE DUN & BRADSTREET CORPORATION, Short Hills, NJ (US)

( * ) Notice: Subject to any disclaimer, the term of this patent is extended or adjusted under 35 U.S.C. 154(b) by 114 days.

(21) Appl. No.: 14/256,483

(22) Filed: Apr. 18, 2014

(65) Prior Publication Data

US 2014/0330706 A1 Nov. 6, 2014

Related U.S. Application Data

(60) Provisional application No. 61/818,809, filed on May 2, 2013.

(51) Int. Cl.
*G06Q 40/00* (2012.01)
*G06Q 40/02* (2012.01)

(52) U.S. Cl.
CPC .................................. *G06Q 40/025* (2013.01)

(58) Field of Classification Search
USPC ........................................................ 705/38
See application file for complete search history.

(56) References Cited

U.S. PATENT DOCUMENTS

| 7,593,893 | B1 | 9/2009 | Ladd et al. | |
|---|---|---|---|---|
| 7,822,757 | B2 | 10/2010 | Stoker et al. | |
| 8,051,049 | B2 | 11/2011 | Remington et al. | |
| 2003/0115133 | A1* | 6/2003 | Bian | G06O 40/025 705/38 |
| 2004/0088253 | A1 | 5/2004 | Crispyn et al. | |
| 2009/0222308 | A1* | 9/2009 | Zoldi | G06Q 20/04 705/38 |
| 2009/0240596 | A1* | 9/2009 | Kennedy | G06Q 30/0601 705/26.1 |

(Continued)

OTHER PUBLICATIONS

Author links open overlay panelLindaAllena1GayleDeLonga AnthonySaundersb2; https://doi.org/10.1016/j.jbankfin.2003.10. 004Get rights and content; Journal of Banking & Finance (Year: 2003).*

(Continued)

*Primary Examiner* — Hani M Kazimi
*Assistant Examiner* — Hatem M Ali
(74) *Attorney, Agent, or Firm* — Ohlandt, Greeley, Ruggiero & Perle, L.L.P.

(57) ABSTRACT

A Total Loss Predictor Score assesses the risk of Total Loss of new credit applications by leveraging the most powerful insights from business databases. The Total Loss Predictor Score built on segmentation and algorithms that use the commercial information from business databases, powered by analytics, delivers a unique solution for credit risk management to help business creditors with origination decisions.

15 Claims, 6 Drawing Sheets

(56) References Cited

U.S. PATENT DOCUMENTS

| 2011/0054981 A1* | 3/2011 | Faith | G06Q 30/02 |
| | | | 705/7.36 |
| 2011/0119176 A1* | 5/2011 | Hanson | G06Q 20/10 |
| | | | 705/37 |
| 2011/0302043 A1* | 12/2011 | Crosthwaite | G06Q 30/04 |
| | | | 705/26.1 |

OTHER PUBLICATIONS

Research on Credit Scoring by fusing social media information in Online Peer-to-Peer Lending byYuejin Zhanga, *, Hengyue Jiaa, Yunfei Diaoa: avaialable online at www.Sciencedirect.com:Information Technology and Quantitative Management (ITQM 2016) (Year: 2016).*

Credit rating prediction using Ant Colony Optimization by D Martens, T Van Gestel, M De Backer, R Haesen, J Vanthienen & B Baesens; Published online: Dec. 21, 2017; Download citation https://doi.org/10.1057/jors.2008.164 (Year: 2017).*

International Search Report dated Aug. 29, 2014 from corresponding PCT Application No. PCT/US2014/034687, 2 pages.

International Written Opinion dated Aug. 29, 2014 from corresponding PCT Application No. PCT/US2014/034687 5 pages.

Examiner's tentative rejection dated Aug. 18, 2015 for corresponding Taiwanese patent application No. 103115706 with English Summary , pp. 9.

Search Report dated Jul. 10, 2015 for corresponding Taiwanese patent application No. 103115706, pp. 2.

* cited by examiner

APPARATUS AND METHOD FOR TOTAL LOSS PREDICTION

CROSS-REFERENCED APPLICATION

This application claims priority from and the benefit of provisional patent application Ser. No. 61/818,809 filed on May 2, 2013, the entire contents of which are incorporated herein by reference, for all purposes.

BACKGROUND OF THE DISCLOSURE

1. Field of the Disclosure

The present disclosure relates to the evaluation of credit risk. More particularly, it relates to a system and method for predicting whether an organization or business to which credit is extended will pay its debt relating to the extension of credit.

2. Description of the Related Art

The traditional credit risk management world uses a delinquency score to manage the origination risk for credit applications. The behavior of new applicants not paying bills is not evaluated separately from delinquency in the industry.

Many businesses have established credit ratings based on their payment history. Although there is never complete certainty, it is relatively easy for another business or a lender to make an evaluation as to whether a business with an established credit rating is a good risk, or whether there is excessive risk if money is loaned to the business via, for example, the extension of credit. Excessive risk may be manifested in the borrower business never paying back the loan it has received as a result of the extension of credit, either because it lacks the ability to repay the loan, or because from the outset, it never intended to pay back the loan.

Many businesses lack a credit history. They may be start up organizations that need credit for the first time. They may be organizations that have not used credit before. They can also be organizations that have borrowed before, but who rarely borrowed, and who do not have a significant credit history. Thus, risk management of new credit applications has been a big challenge to business creditors, since they have no or limited trade information on new applicants. These new applicants typically represent more uncertainty of risk than existing customers.

There exists a need for a system and method for predicting whether a business or other organization without a credit history is a good credit risk.

SUMMARY OF THE DISCLOSURE

One aspect of the disclosure is directed to a Total Loss Predictor Score by capturing no ability to pay, as well as no intention to pay. Additional information that is not related to trade is also leveraged. The Total Loss Predictor Score improves risk management decisions with smarter defense against non-payment risk from applicants.

The Total Loss Predictor Score provides an effective tool to detect extreme risk behavior of never making a payment, which is not feasible using a delinquency score.

The Total Loss Predictor score can also be used for reverse decisioning. For creditors that have higher risk tolerance, the Total Loss Predictor Score can help them approve more applications who may not pay on time, but will pay eventually.

In addition, the Total Loss Predictor score also leverages non-traditional data sources to evaluate the no payment behavior, such as velocity of data changes, velocity of inquiries on a business, and type of delivery address.

The Total Loss Predictor Score is optimized on the population of new credit applicants. The solution suite consists of four statistical models and override rules.

The four statistical models are segmented by trade thickness and prior delinquency behavior. Each model is based on a mathematical algorithm that best fits the characteristics and risk profiles of the sub-population. The development sample selects over 200,000 businesses that opened new accounts from November 2010 to October 2011, tracks their performance in the following 9 months, and identifies those who never pay bills. The risk of Total Loss is defined as the obligor has at least 80% of the outstanding balance associated with no payment accounts. The no payment account is defined as an account that has non-decreasing balance in 121+ days past due dollars in all reported months. Predictive attributes are appended from CSAD (Credit Scoring Archive Database), DTRI (Detailed Trade Risk Insight), Intelligence Engine, historical inquiry, and delivery sequence files on each business at the observation date. Advanced modeling tools and techniques to build the most predictive models that rank order the risk of Total Loss are applied.

The following attributes are found to be the more predictive in detecting businesses which never pay bills. They include recency of delinquency, severity of delinquency, credit limit and usage of open accounts, industry, region, control years of current management, velocity of certain data changes, velocity of inquiry, and business address at a non-commercial location. All attributes are weighed optimally in a mathematical equation to achieve the highest discrimination power.

The model captures almost 67% of no payment businesses in the worst scoring 20% of the population. The Kolmogorov-Smirnov (K-S) statistic, which measures the maximum distance between the cumulative density functions of the risk and good businesses, is 49 in the development data. The K-S statistic is superior measurement in credit scoring practice.

The Total Loss Predictor Score can be applied in credit origination decisions to prevent extreme risk. It can also be applied to set up risk knockout screening criteria for marketing purposes.

The present disclosure is directed to a system for evaluating risk of extending credit to a business, comprising an access path to storage containing data concerning the business, the data including a plurality of variables; a storage for weights to be assigned to each of the variables; and a processor for processing the data and the weights to determine a score indicative of whether extending credit will result in a total loss to a party extending the credit.

The processor further determines a risk class based on the score. The risk class can be determined by accessing a table having ranges of scores, and for each range of scores, a corresponding risk class.

The data can include trade data, firmographic data, public data, intelligence engine data, inquiry data, and verification of a commercial address.

The storage contains a plurality of scorecards for computing the score. A scorecard can be selected based on whether the business has or does not have trade data. Further, a scorecard can be selected based on prior payment behavior.

If the business has trade data, the scorecard is selected on the basis of one of a, b and c, wherein a. the trade data is detailed trade data and there is no prior severe delinquency; b. the trade data is thick trade data, and the business has prior severe delinquency; and c. the trade data is thin, and the business has prior severe delinquency. The trade data is considered to be thin if there are one or two trades, and the trade data is considered to be thick if there are three or more trades.

The variables can comprise the number of accounts on file for the business, the payment history of the business, industry risk for the business, state of location of the business, and confirmation of business information from external sources.

The disclosure is also directed to a method for evaluating risk of extending credit to a business, comprising: accessing data concerning the business, the data including a plurality of variables; accessing weights to be assigned to each of the variables; and processing the data and the weights to determine a score indicative of whether extending credit will result in a total loss to a party extending the credit.

The method further comprises determining a risk class based on the score. The risk class is determined by accessing a table, the table having ranges of scores and for each range of scores, a corresponding risk class.

The data used in the method can comprise trade data, firmographic data, intelligence engine output data, and verification of a commercial address.

The score is computed by accessing a plurality of scorecards for computing the score, and selecting a scorecard based on type of data available. A scorecard is selected based on whether the business has or does not have trade data.

If the business has trade data, the scorecard is selected on the basis of one of a, b and c, wherein a. the trade data is clean detailed trade data; b. the trade data is thick trade data, and is not clean detailed trade data; and c. the trade data is thin, and is not clean detailed trade data. The trade data is considered thin if there are one or two trades, and the trade data is considered thick if there are three or more trades.

The variables in the method can comprise the number of accounts on file for the business, the payment history of the business, industry risk for the business, state of location of the business, and confirmation of business information from external sources.

In the system and method, total loss can be defined as the business having at least eighty percent of an outstanding credit balance associated with no payment accounts. A no payment account can be defined as an account that has non-decreasing balance for more than one hundred twenty one days past due in all reported months.

Yet another embodiment of the disclosure is directed to a computer readable non-transitory storage medium storing instructions of a computer program which when executed by a computer system results in performance of steps of a method for evaluating risk of extending credit to a business, comprising accessing data concerning the business, the data including a plurality of variables; accessing weights to be assigned to each of the variables; and processing the data and the weights to determine a score indicative of whether extending credit will result in a total loss to a party extending the credit.

BRIEF DESCRIPTION OF THE DRAWINGS

A component or a feature that is common to more than one drawing is indicated with the same reference number in each of the drawings.

DESCRIPTION OF THE EMBODIMENTS

Figure 1:
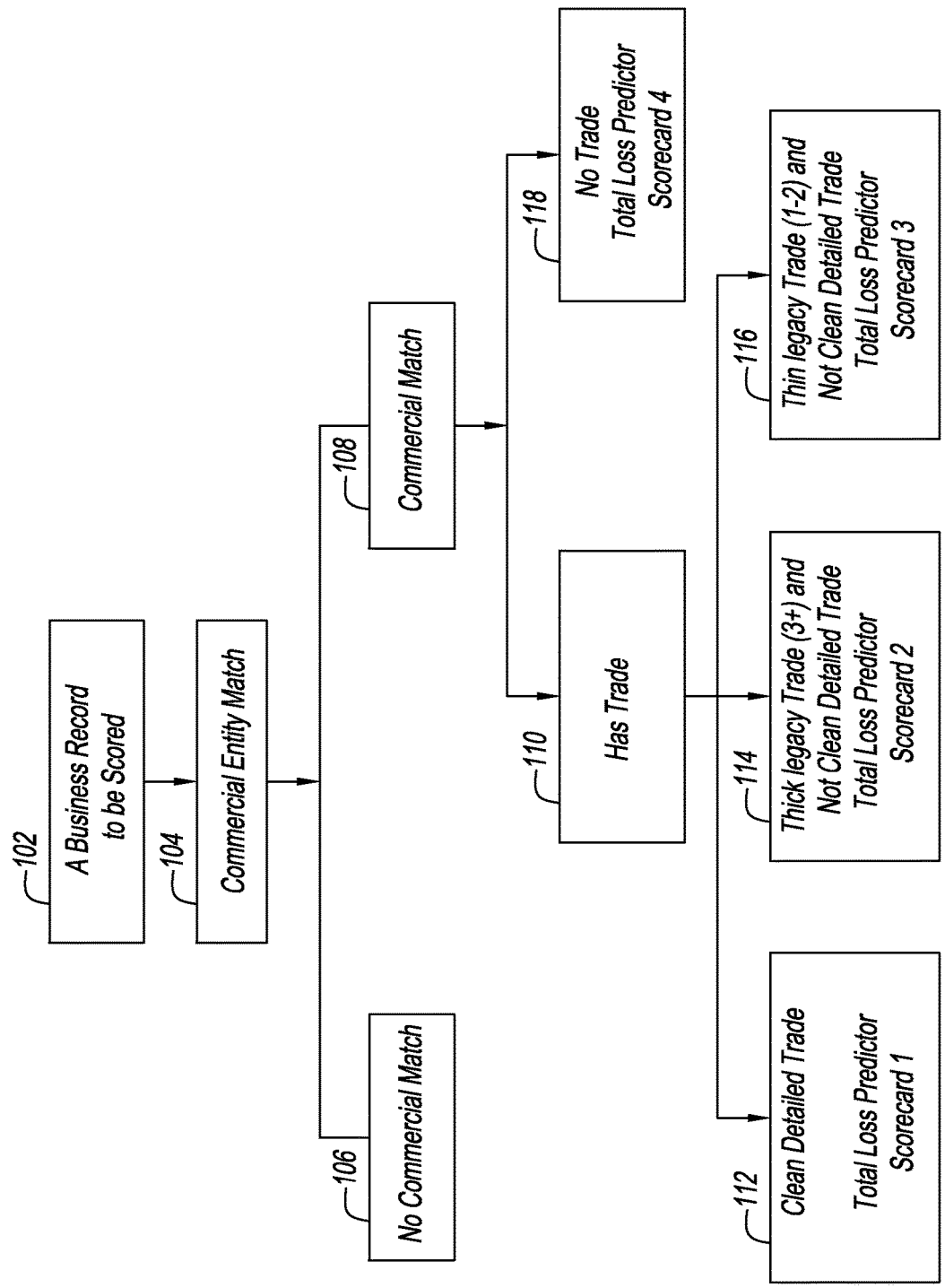
FIG. 1 is a flow chart of the process for computing a total loss prediction score.

For credit management professionals who need to identify and assess extreme risk applicants, Total Loss Predictor is a predictive tool that predicts the probability of a customer never paying, based on their similarities with other companies in the business database that don't pay. The Total Loss Predictor leverages data sources to protect the bottom line of a business with the highest degree of predictability, identifying extreme risk credit applicants who pose the greatest threat of never paying. The Total Loss Predictor predicts the likelihood of a company never paying. Never paying is defined at the account level whereby the total balance owing since the time of origination rolls to 121+ days past due. A bad business is one with 80% or more of its dollars owing associated with these "never pay" account originations. This predictor is designed to identify first time payment default, straight rollers, or fictitious/shell companies. It is not designed to identity never pay performance due to theft, account takeovers, or bust outs. The Total Loss Predictor score uses statistical probabilities to classify companies into two primary risk classifications: a 2002-2999 Risk Score and a 1-10 Risk Class. These classifications are based on the probability of a business experiencing the above definition of "never pay" over the next 9-month period.

The Total Loss Predictor utilizes the combined power of a vast information database on 30 million U.S. businesses, including Detailed Commercial Payment Experiences that captures month-to-month payment trends, Public Filing, Demographic, Trade Proxies, and Financial information. The integrity of the information contained in the database is driven by the DUNSRIGHT® Quality Process, as described in U.S. Pat. No. 7,822,757, and a Global Data, Insights & Analytics (GDI&A) Strategy. The DUNSRIGHT process is the process for collecting and enhancing information. GDI&A focuses on advanced data improvements and innovations fueling the improvements in delivering predictive and actionable insight to our customers. An expert team of statisticians and economists lead the development of Predictive Indicator solutions, the fifth and final component of the sequential DUNSRIGHT process, and are responsible for turning the vast commercial database into actionable business insight, enabling users to more confidently make critical risk decisions. The Total Loss Predictor is a suite of scorecards—a proprietary modeling system disclosed herein—that is highly effective in helping to predict never getting paid from new applicants and prospective customers. The solution adds greater precision, accuracy, and confidence in allowing a user to:

Eliminate the most extreme risk applications and focus your risk management resources on companies with the intent and ability to pay.

Screen out the highest risk prospects before incurring any marketing or application processing expense.

Reduce the bad debt losses associated with applicants that closely resemble fraudulent, fictitious businesses.

Free up resources to focus on pricing strategies for applicants that intend to eventual pay, even if there is a pattern of past delinquency.

Prioritize and accelerate legal collection actions to improve cash flow and reduce the expense and the success rate associated with third party collection agencies.

When developing the bad definition for the Total Loss Predictor, the inventors leveraged many years of experience developing custom models based on a specific customer application and existing account portfolios, and predicting specific "bad" definitions, including first time payment default, delinquency and fraud. A high correlation between first time payment default and fraud has been observed. To help minimize losses from businesses with no intent to pay, the inventors designed the Total Loss Predictor disclosed herein based on detailed payment performance history on businesses that requested credit for the first time and never paid. It was found that the characteristic of these businesses resemble fictitious or shell companies. Thus, identifying these types of businesses before credit is extended can help minimize losses. The Total Loss Predictor provides the precision and insight needed to safeguard against high, outstanding exposure with companies who are highly likely to never make a payment. The Total Loss Predictor predicts the likelihood that a company will never pay. Specifically, a company that never pays is defined as one with 80% or more of its total dollars owing associated with never paying accounts. The scores and underlying models are based upon the observed characteristics of hundreds of thousands of businesses in the database and the relationship these characteristics have to the probability of a new customer never paying.

The Total Loss Predictor assigns two measurements of risk:

1. A "Score" of 2010-2999, where 2010 represents businesses that have the highest probability of never paying and 2999 represents businesses with the lowest probability of never paying. This score provides a direct relationship between the score and the level of risk. The marginal odds of being good doubles for each 60 point increase. For example, a score of 2015, on a marginal basis, represents twice the risk as a score of 2075. This score enables a customer to utilize more granular cutoffs to drive their automated decision-making process. The score of 2002 is assigned to special situations of high risk conditions. In this regard, Availability Rules are discussed below.

2. A "Class" of 1-9, which is a segmentation of universe into nine distinct groups where a one (1) represents businesses that have the lowest probability of never paying, and a nine (9) represents businesses with the highest probability of never paying. This Class enables a creditor to quickly segment their new accounts into various risk segments to determine appropriate credit policies. Class 10 is associated with above score value of 2002. Table II Illustrates the distribution of the Total Loss Predictor Risk Class in the development sample.

A Total Loss Predictor is available on approximately 30 million U.S. based companies. The Total Loss Predictor is treated specially on business files that fall into the following categories:

A. Business Branch Locations: these inquiries will result in an automatic trade-up to a headquarter location.

B. Large business: if total number of employees is 500 or more, then Total Loss Predictor score is not lower than 2482, or not in class 7, 8 or 9.

C. Business uncertainty: if information sources have triggered a business uncertainty condition within the last 12 months, then Total Loss Predictor score is not higher than 2749, or not in class 1.

D. Businesses that meet the following conditions will be assigned the higher risk score value of 2002, or class of 10:

1. High risk cases—A company which displays characteristics of misrepresentation.

2. Unable to confirm (UTC) operations—Business shows limited to no business activity and has multiple signs of inactivity (e.g. disconnected phone, vacant address, no longer in a telephone directory etc.).

3. Out of business—Business is either bankrupt (Chapter 7) or an officer or owner of the business confirmed they no longer operate and are out of business.

4. Open bankruptcy—Business has filed for bankruptcy and the plan of reorganization is not yet confirmed.

5. Business deterioration within the last 12 months—A company which displays signs of financial distress, including signs of current or imminent business failure or operating difficulty.

6. Self-requested DUNS numbers without investigation—A company that has self-requested a DUNS number and an investigation has not yet been conducted.

The models built for the Total Loss Predictor leverage the extensive commercial database. All the information contained within the database passes through the DUNS Right Quality Process. One of the primary reasons the predictive scores are so powerful is the quality of the information used in their development.

The Total Loss Predictor scoring models were developed using statistical modeling techniques to select and weight the data elements that are most predictive of never pay behavior. The resulting Total Loss Predictor models are mathematical equations that consist of a series of variables and coefficients (weights) that have been calculated for each variable.

Model development involves selecting data available at the time of observation that will indicate how the account is expected to perform over a certain period of time. A total of 238,361 businesses requesting credit for the first time from a Trade Provider were used to develop the Total Loss Predictor. Of this population, approximately 2,650 went "bad" or never paid.

In the model development process, data is collected from two time periods designated as an observation window and a performance window. The observation window defines the sample used in the model, and all identification and characteristic data are collected from this time period. The predictive variables and segmentation schemes are defined from this snapshot. The performance window defines the length of time the accounts are tracked to examine their never pay behavior.

In the development of the Total Loss Predictor, the observation windows are new accounts originated during a one year period (12 monthly cohorts), and the performance window was the 9 months following each cohort, respectively.

From the observation window data, extensive data analysis to determine those variables which are statistically the most significant factors for predicting never pay performance and calculates the appropriate weights for each, is performed. Access to a vast database of 30 million quality U.S. business records uniquely qualifies the disclosed system and method to demonstrate this impact.

Almost 2,000 predictive variables have been identified to evaluate a combination of both "good" and "bad" performing businesses in the database, and selected the most significant predictors to build the Total Loss Predictor models. A scoring system that accounts for the correlation between the data and the risk level of never pay on new accounts after origination was developed. The result is a suite of models consisting of multiple unique scorecards. This segmented solution is driven by the performance and depth of both detailed (new structure) and summarized (legacy structure) trade. Each model was developed and optimized on a more homogenous subpopulation to account for the amount of information contained in our database on the business.

Having a suite of models allows for better separation of "goods"—those that pay, and "bads"—those that never pay, by focusing on unique populations. It also provides for the most predictive score possible optimized on the data availability. The Total Loss Predictor, therefore, provides maximum risk discriminatory power with segmented scorecards for improved risk management decisions and to pre-screen out extreme risk companies.

For a business that is new to a supplier there are three possibilities:

Detailed Trade and Prompt at Time of Observation (Prompt is defined as % accounts past due in the last quarter<50%).

Extensive Number of Summarized Trade and Slow at Time of Observation

Limited Number of Summarized Trades and Slow at Time of Observation

For the appearance of trade information, the first three segments or possibilities listed above are businesses that are 'new to supplier', meaning they were extended credit for the first time from a given trade provider. The fourth segment is businesses that are 'new to world', meaning they were extended credit from the first time from any trade provider, and there is no trade reported at the time of observation. The models were developed based on the availability of data in each segment and the associated predictive power. In addition to trade, public record, and demographic data, other data sources, not available in the past, are used in the Total Loss Predictor models, such as intelligence engine signals, historical inquiries, and address delivery data. Those new data sources provide very useful evaluation of business risk on those new businesses without trade at observation time.

One way to measure model performance is by examining a trade-off curve. Below is a trade-off curve that illustrates the effectiveness of the Total Loss Predictor. A trade-off curve is a plot of ascending accumulation of good accounts vs. bad accounts. It is useful for illustrating model performance both at a particular score and across the spectrum of score distribution.

It has been found that at approximately 20% of the cumulative population, the Total Loss Predictor identifies approximately 67% of the cumulative "bads". This means that if a business focused on the worse scoring 20% of their new applicants using the Total Loss Predictor, they would identify or capture 67% of those that never pay.

During the course of model development, various statistics from the development sample are gathered. Development statistics provide information that can be used to help determine credit policy related to the use of the models. For several reasons, however, statistics from model development should not be construed as precise forecasts for individual portfolios.

In addition, models are developed assuming that the relationships observed between past customers' characteristics and subsequent payment performance will hold true on future customers. Because of this assumption development statistics should be viewed as estimates, and not precise forecasts, of future performance at a given score.

Nevertheless, the models described herein are robust predictive tools for rank-ordering risk in changing circumstances; higher scoring businesses perform better than lower scoring businesses. Tracking the score distributions and the actual performance of accounts provides the most accurate projections for individual portfolios.

FIG. 1 is a flow chart illustrating the segmentation scheme to determine which scorecard to be used to score a business record by the Total Loss Predictor Score.

At 102, the name, address and phone number of the business record are determined. At 104, an attempt is made to match the record to an entry in the commercial entity database using the DUNSRIGHT® Process. At 106, if a business cannot be successfully matched to a DUNS number, then no Total Loss Predictor Score for the business is returned, and the process is terminated for that inquiry.

At 108, if a business commercial match is available, the record for that business is assigned a unique business identifier, i.e. DUNS number, and the record is appended with trade information. At 110, if a business has trade, it is scored by one of three scorecards. At 112, a business with clean detailed trade is scored by Scorecard 1. At 114, a business with thick legacy trade (3+ trade experiences) and not clean detailed trade is scored by Scorecard 2. At 116, a business with thin legacy trade (1-2 trade experiences) and not clean detailed trade is scored by Scorecard 3. If the business has no trade, at 118, the record is scored by a Scorecard 4.

When there is no trade data for a business, reliance is placed on demographic data, public data, and other non-traditional data, such as Intelligence Engine, history inquiry, and delivery sequence files to determine a Total Loss Predictor Score.

Table 1 shows an example of the scoring process of a business record.

TABLE 1

Exemplary Scoring Processing for a Business Record

| | Step in Process | Activity | State of Record/Profile |
|---|---|---|---|
| 1 | Record is in box 102 | Waiting to enter segmentation | Business Name/Address/Phone: Gorman Bike Shop 1 Main Street New York, NY 10118 (917) 555-5555 |

TABLE 1-continued

Exemplary Scoring Processing for a Business Record

| Step in Process | Activity | State of Record/Profile |
|---|---|---|
| 2 Commercial match process, box 104 | Business name, address and phone number are matched to commercial entity database. A unique business identifier (i.e. DUNS) is assigned. | Business Name/Address/Phone: Gorman Bike Shop 1 Main Street New York, NY 10118 (917) 555-5555 DUNS: 123456789 |
| 3 Check if business has trade, box 110 | Append the detailed trade and legacy trade of the business from database | Business Name/Address/Phone: Gorman Bike Shop 1 Main Street New York, NY 10118 (917) 555-5555 DUNS: 123456789 Total trades: 5 |
| 4 Scorecard assignment, box 110 | The record is scored by scorecard 1. | Business Name/Address/Phone: Gorman Bike Shop 1 Main Street New York, NY 10118 (917) 555-5555 DUNS: 123456789 Percentage of negative trade: 6% Recency of delinquency: 0 Ratio of IE telecom signal: 0.1 And other data elements Score segment: Clean detailed trade Score: 2710 |

Figure 2:
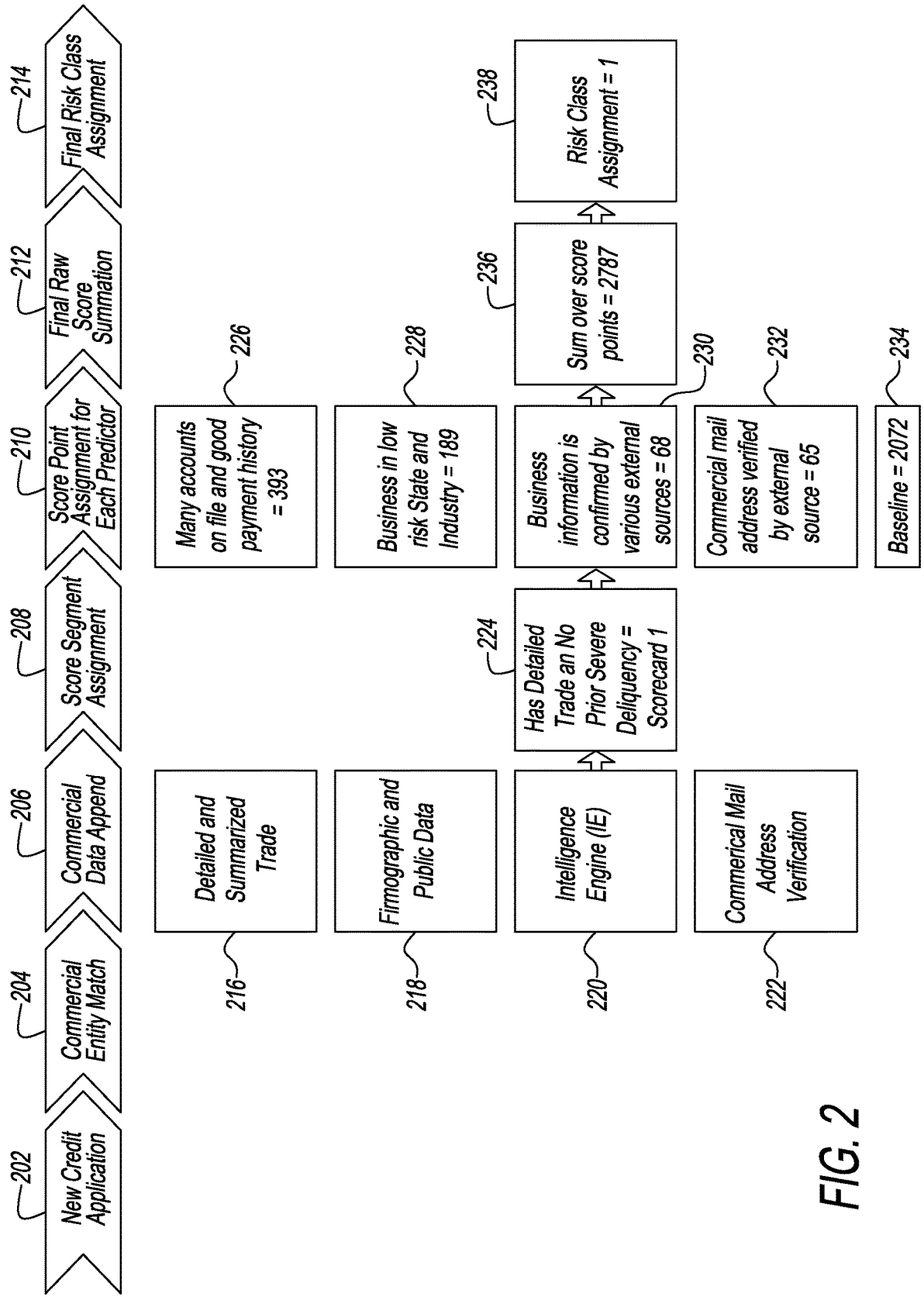
FIG. 2 is a flow chart of the manner in which a first scorecard is used to produce a total loss predictor score.

FIG. 2 illustrates the manner of operation of Scorecard 1 of FIG. 1. At 202, a new credit application is received. At 204 a check is made to determine whether there is a commercial entity match (FIG. 1, 104). If there is a match at 206, commercial data is appended to the records of the new credit application. At 208 score segment assignments are made as described below. At 210, a score point assignment is made for each predictor. At 212 a final raw score summation is computed. At 214 a final risk class assignment is made as described below.

An example for Scorecard 1 starts with the sources from which data is drawn. At 216 detailed and summarized trade is accessed. At 218 firmographic and public data is accessed. At 220 an intelligence engine, as described in U.S. Pat. No. 8,051,049, is used to process the data accessed at 216 and 218. At 220, the commercial mailing address of the businesses verified.

At 224 a determination is made as to whether there was detailed trade information and no prior severe delinquency to make the decision to use Scorecard 1.

Scorecard points are assigned based on the following:

At 226, if there are many accounts on file and a good payment history, 393 points are allocated. At 228 if the business being evaluated is in a low risk industry and in a low risk state, 189 points are allocated. At 230, if business information is confirmed by various external sources, 68 points are added. At 232, if the mailing address of the business is verified to be a commercial address (as opposed to a residence) by external sources, 65 points are allocated. At 234, a baseline of 2072 points is allocated.

At 236, the sum of all of the allocated points mentioned above is calculated. In this case, there are a total of 2,787 points allocated. Using TABLE II below, the Total Loss Predictor Risk Class for a score of between 2750 and 2999 is in class 1.

TABLE II

| Total Loss Predictor Risk Class | % Businesses Within this Risk Class | Score Range |
|---|---|---|
| 1 | 15% | 2750-2999 |
| 2 | 20% | 2701-2749 |
| 3 | 25% | 2635-2700 |
| 4 | 10% | 2605-2634 |
| 5 | 15% | 2543-2604 |
| 6 | 9% | 2482-2542 |
| 7 | 3% | 2446-2481 |
| 8 | 2% | 2399-2445 |
| 9 | 1% | 2010-2445 |
| 10 | <1% | 2002 |

A logistic regression is used to determine the optimal weights for each variable. The dependent variable can be whether the business is paying verses not paying in the reported months. The independent variables can be selected from all available information at the time of observation. The statistical software package can be one provided by SAS.

Figure 2A:
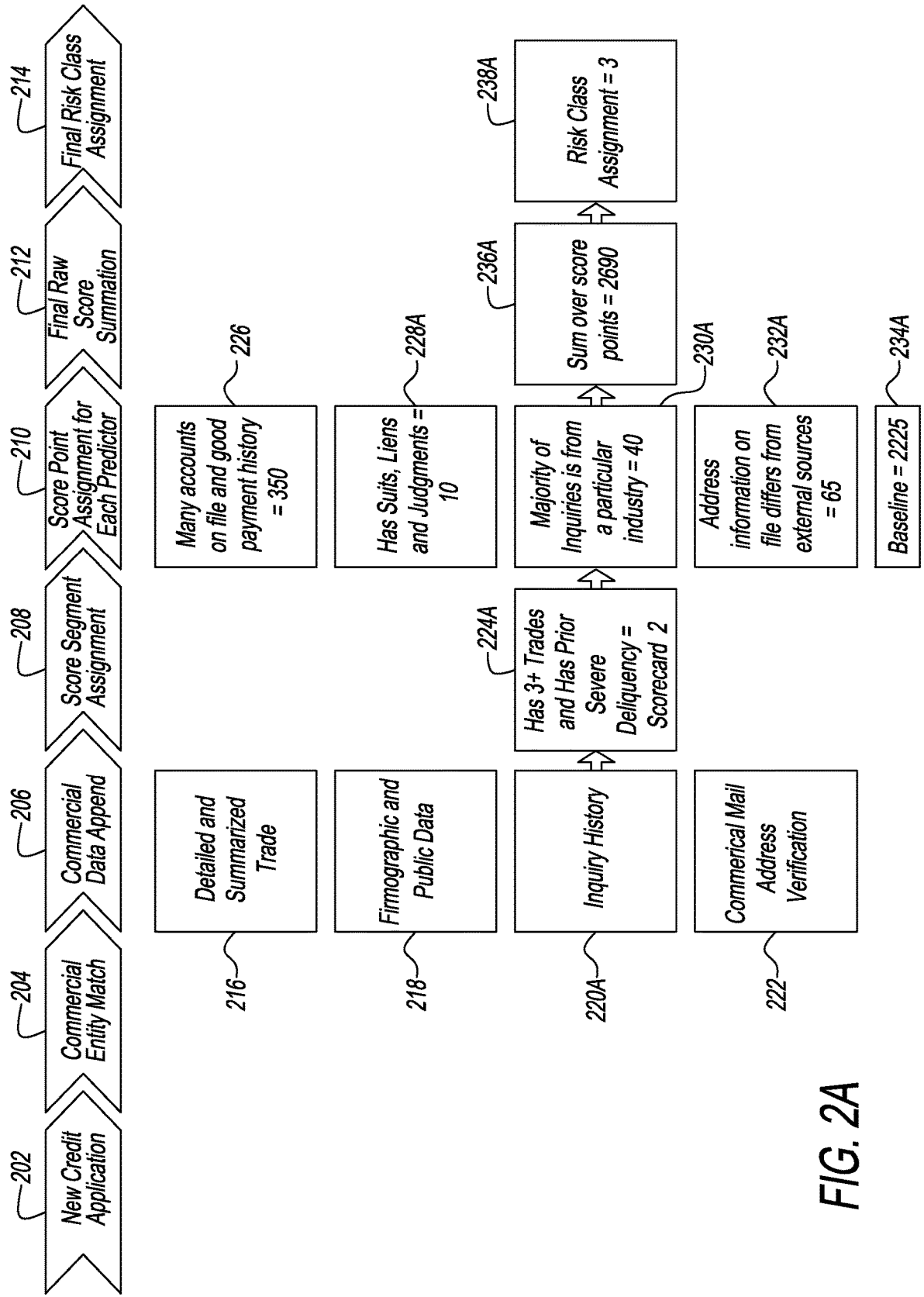
FIG. 2A is a flow chart of the manner in which a second scorecard is used to produce a total loss predictor score.
Figure 2B:
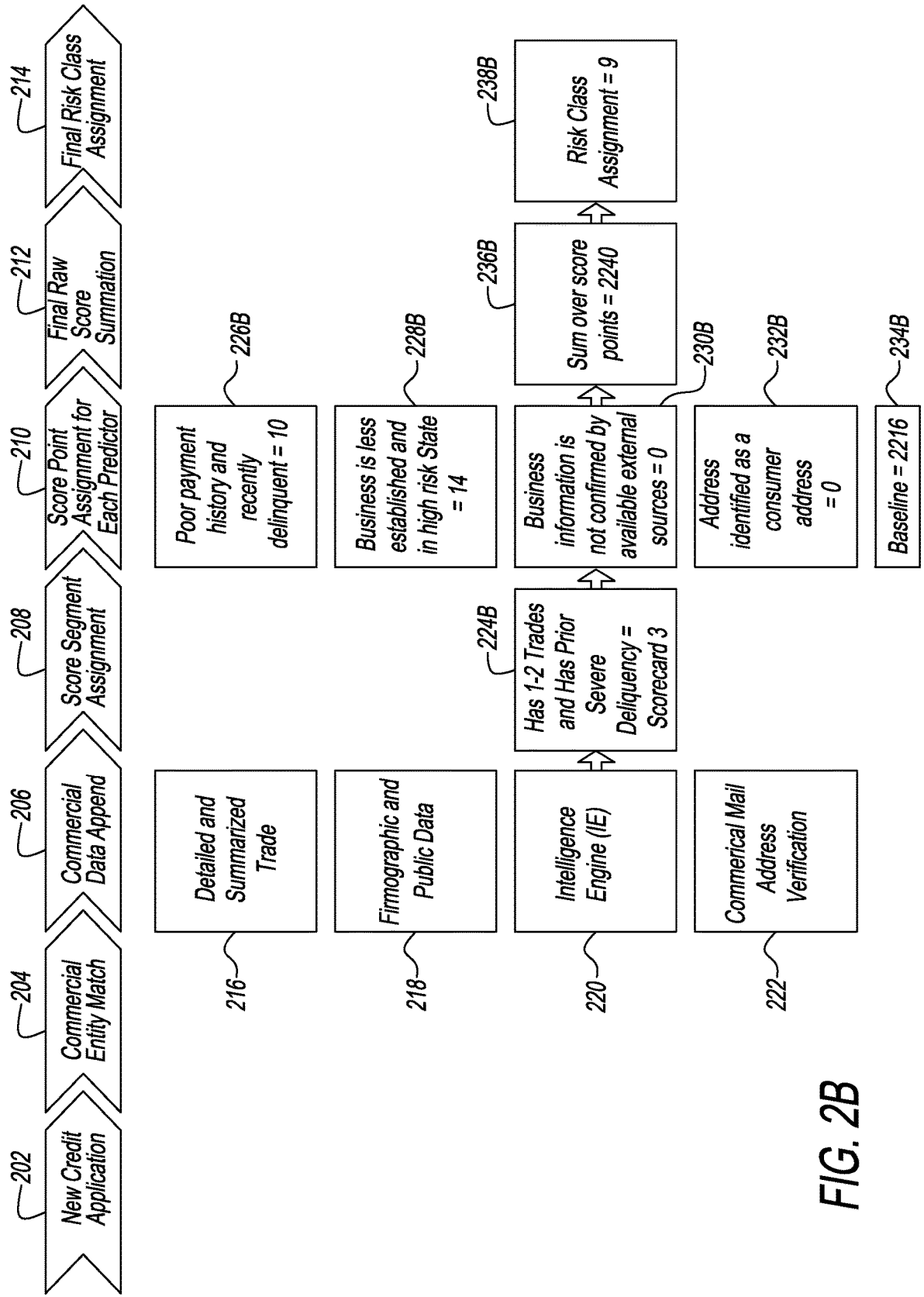
FIG. 2B is a flow chart of the manner in which a third scorecard is used to produce a total loss predictor score.
Figure 2C:
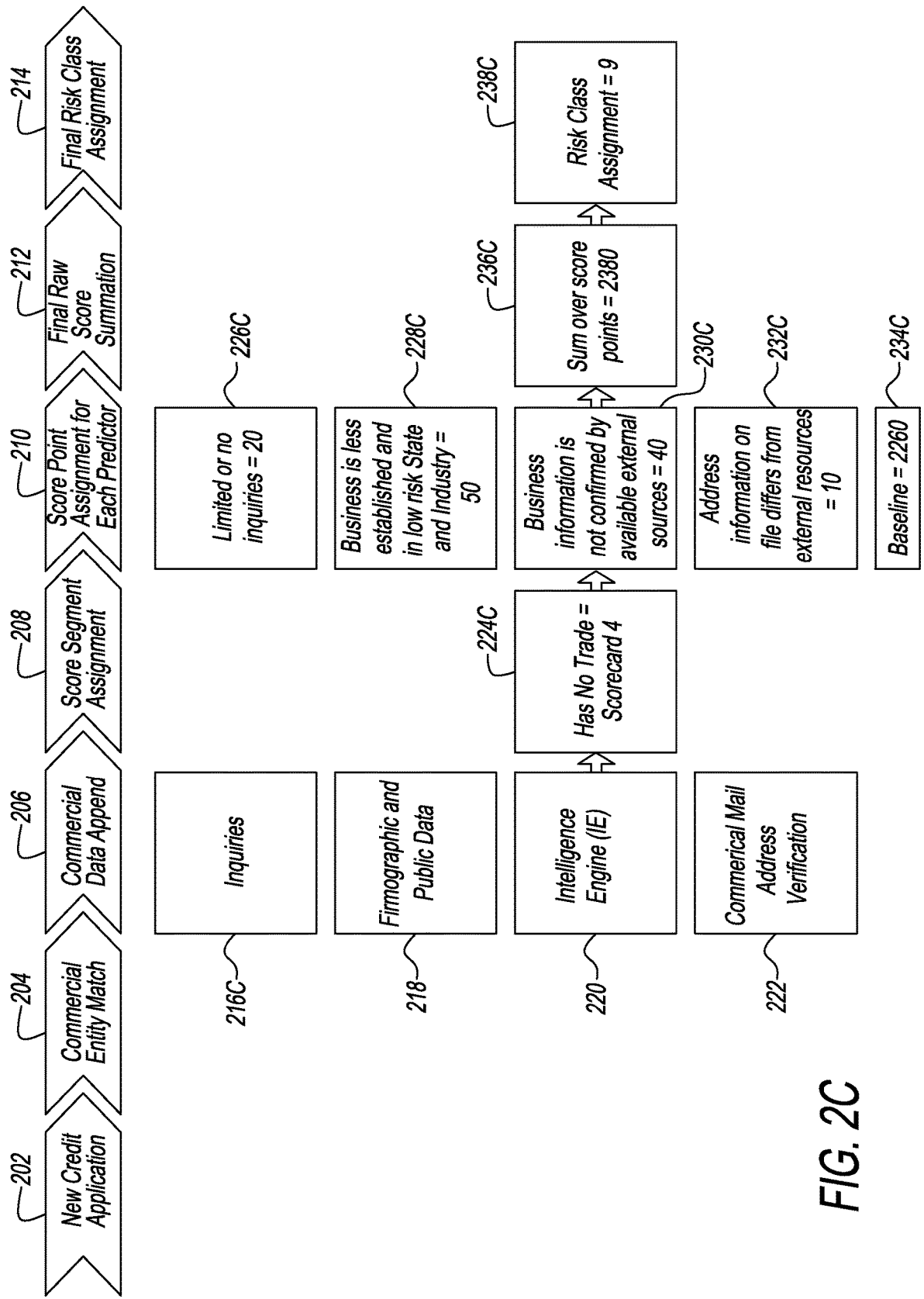
FIG. 2C is a flow chart of the manner in which a fourth scorecard is used to produce a total loss predictor score

FIG. 2A, for scorecard 2, is similar to FIG. 2, except for changes indicated by reference numerals having the suffix A. FIG. 2B, for scorecard 3, is similar to FIG. 2, except for changes indicated by reference numerals having the suffix B. FIG. 2C, for scorecard 4, is similar to FIG. 2, except for changes indicated by reference numerals having the suffix C.

Figure 3:
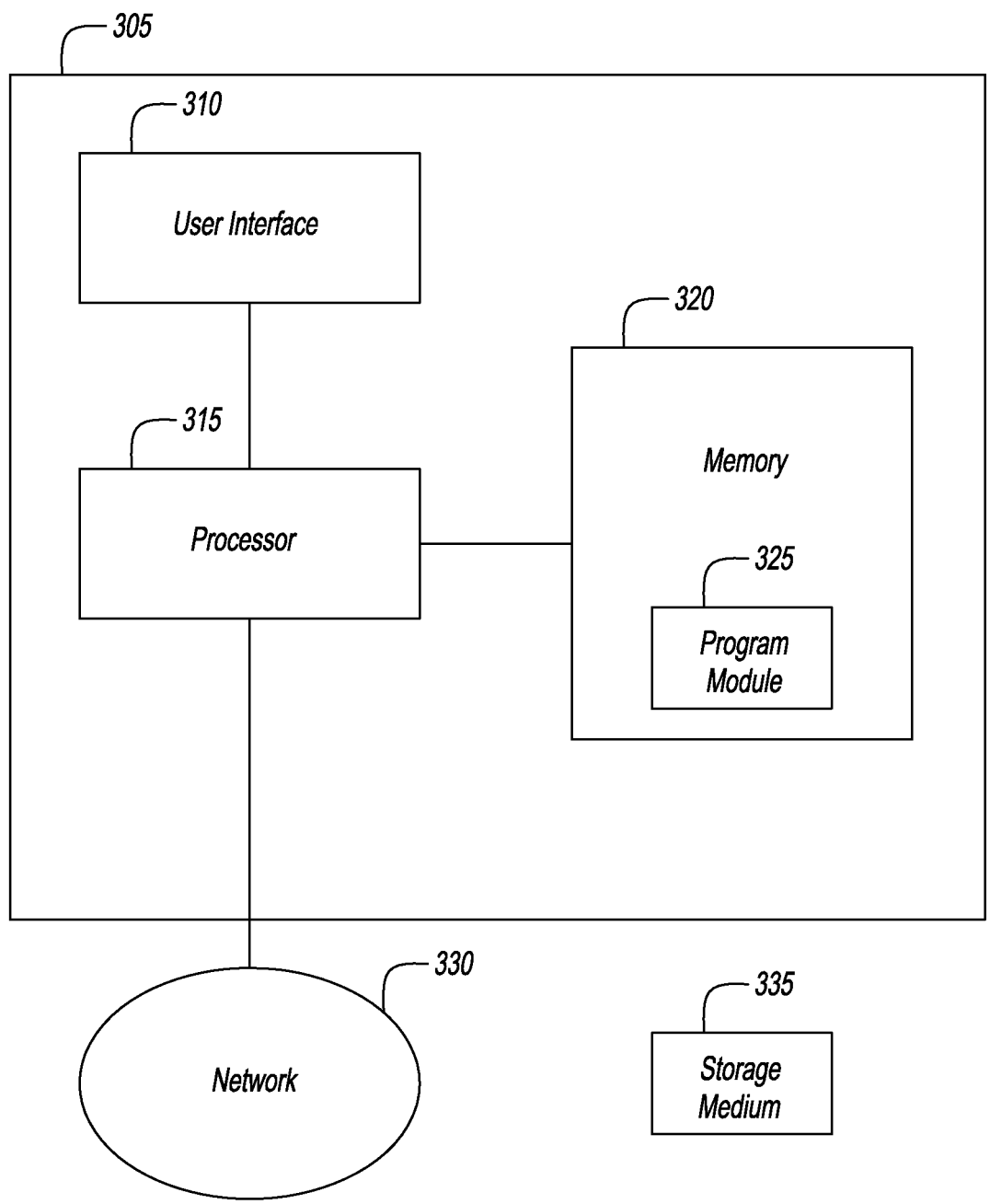
FIG. 3 is a block diagram of computer system that is used to implement the embodiment described herein.

Referring to FIG. 3, there is shown a system generally represented by reference numeral 300 of the present disclosure. System 300 includes a computer 305 coupled to a network 330, e.g. the Internet.

Computer 305 includes a user interface 310, a processor 315, and a memory 320. Computer 305 may be implemented on a general-purpose microcomputer. Although computer 305 is represented herein as a standalone device, it is not limited to such, but instead can be coupled to other devices (not shown) via network 330.

Processor 315 is configured with logic circuitry that responds to and executes instructions.

Memory 320 stores data and instructions for controlling the operation of processor 315. Memory 320 may be implemented in a random access memory (RAM), a hard drive, a read only memory (ROM), or a combination thereof. One component of memory 320 is a program module 325.

Program module 325 contains instructions for controlling processor 315 to execute the methods described herein. For example, as a result of execution of program module 325, processor 315 can provide a score, that is an indication based on intention and ability to pay.

The term "module" is used herein to denote a functional operation that may be embodied either as a stand-alone component or as an integrated configuration of a plurality of sub-ordinate components. Thus, program module 325 may be implemented as a single module or as a plurality of modules that operate in cooperation with one another. Moreover, although program module 325 is described herein as installed in memory 320, and therefore being implemented in software, it could be implemented in anyone of hardware (e.g., electronic circuitry), firmware, software, or any combination thereof.

User interface 310 includes an input device, such as a keyboard or speech recognition subsystem, for enabling a user to communicate information and command selections to processor 315. Specifically, data to be used to implement the methods described herein can be entered with user interface 310, or can be downloaded from a network 330. User interface 310 also includes an output device including, but not limited to, a display or a printer. A cursor control including, but not limited to, a mouse, track-ball, or joy stick, allows the user to manipulate a cursor on the display for communicating additional information and command selections to processor 315.

Processor 315 outputs to user interface 310 a result of an execution of the methods described herein. Alternatively, processor 315 could direct the output to a remote device (not shown) via network 330.

While program module 325 is shown as already loaded into memory 320, program module 325 may be configured on a storage medium 335 for subsequent loading into memory 320. Storage medium 335 can be any conventional storage medium that stores program module 325 thereon in tangible form. Examples of storage medium 335 include, but are not limited to, a floppy disk, a compact disk, a magnetic tape, a read only memory, an optical storage media, universal serial bus (USB) flash drive, a digital versatile disc, and a zip drive. Alternatively, storage medium 335 can be a random access memory or other type of electronic storage, located on a remote storage system and coupled to computer 305 via network 330.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof

What is claimed is:

1. A system for predicting whether extending credit to a first party which lacks a credit history due to no or limited trade data will result in a total loss to a second party that extends credit to the first party, the system comprising a processor and a memory that has instructions that are readable by the processor and cause the processor to obtain a financial risk score for the first party by performing the following steps in order:
   collect non-traditional data relating to the first party, wherein said non-traditional data is at least one selected from the group consisting of:
   publicly available data,
   demographic data,
   intelligent engine signals,
   deliver sequence files,
   velocity of data changes,
   velocity of historical inquiries pertaining to the first party, and
   address delivery data;
   access stored weights to be assigned to each item of the non-traditional data;
   apply the assigned weight to each item of non-traditional data to generate weighted non-traditional data;
   process the weighted non-traditional data to determine a score for each item of non-traditional data;
   add the score for each item of non-traditional data to obtain a score total;
   add the score total to a baseline score to obtain a financial risk score; and, after the financial risk score is obtained,
   compare the financial risk score to historical financial risk scores to obtain a risk class between 1 and 9 for the first party, wherein 1 represents the lowest risk of never paying and 9 represents the highest risk of never paying, to determine whether the first party has no ability or no intention to pay the second party and whether extending credit to the first party will result in a total loss to the second party, wherein total loss is defined as the first party having at least eighty percent of an outstanding credit balance associated with accounts that have non-decreasing balances for more than one hundred twenty one days past due in the payment history, and wherein said processor that performs the steps is able to predict the total loss to the second party which is otherwise not available because the first party lacks a credit history.

2. The system of claim 1, further comprising instructions that cause the processor to access a plurality of scorecards after the retrieve step to compute the score total, wherein a scorecard is selected from the plurality of scorecards based on the type of commercial information data available.

3. The system of claim 2, wherein the scorecard is selected based on whether the first party has or does not have trade data.

4. The system of claim 3, wherein, if the first party has trade data, the scorecard is selected based on one of a, b and c, wherein:
   a. the trade data is detailed trade data and there is no prior severe delinquency;
   b. the trade data is thick trade data, and the first party has prior severe delinquency; and c. the trade data is thin trade data, and the first party has prior severe delinquency.

5. The system of claim 4, wherein the trade data is thin trade data if there are one or two trades and the trade data is thick trade data if there are three or more trades.

6. A method for predicting whether extending credit to a first party which lacks a credit history will result in a total loss to a second party that extends credit to the first, the method comprising providing a processor and a memory that has instructions that are readable by the processor and cause the processor to obtain a financial risk score for the first party by performing the following steps in order:
   collecting non-traditional data relating to the first party, wherein said non-traditional data is at least one selected from the group consisting of:
   publicly available data,
   demographic data,
   intelligent engine signals,
   deliver sequence files,
   velocity of data changes,
   velocity of historical inquiries pertaining to the first party, and
   address delivery data;
   accessing stored weights to be assigned to each item of the non-traditional data;
   applying the assigned weight to each item of non-traditional data to generate weighted non-traditional data;
   processing the weighted non-traditional data to determine a score for each item of non-traditional data;
   adding the score for each item of non-traditional data to obtain a score total;
   adding the score total to a baseline score to obtain a financial risk score; and, after the risk score is obtained,
   comparing the financial risk score to historical financial risk scores to obtain a risk class between 1 and 9 for the first party, wherein 1 represents the lowest risk of never paying and 9 represents the highest risk of never paying, to determine whether the first party has no ability or no intention to pay the second party and whether extending credit to the first party will result in a total loss to the second party, wherein total loss is defined as the first party having at least eighty percent of an outstanding credit balance associated with accounts that have non-decreasing balances for more than one hundred twenty one days past due in the payment history, and wherein said processor that performs the steps is able to predict the total loss to the second party which is otherwise not available because the first party lacks a credit history.

7. The method of claim 6, further comprising instructions that cause the processor to perform the step of accessing a plurality of scorecards after the collecting step to compute the score total, wherein a scorecard is selected from the plurality of scorecards based on the type of commercial information data available.

8. The method of claim 7, wherein the scorecard is based on whether the first party has or does not have trade data.

9. The method of claim 8, wherein, if the first party has trade data, the scorecard is selected based on one of a, b and c, wherein:
   a. the trade data is detailed trade data and there is no prior severe delinquency;
   b. the trade data is thick trade data, and the first party has prior severe delinquency; and
   c. the trade data is thin trade data, and the first party has prior severe delinquency.

10. The method of claim 9, wherein the trade data is thin trade data if there are one or two trades and the trade data is thick trade data if there are three or more trades.

11. A computer readable non-transitory storage medium storing instructions of a computer program which when executed by a computer system results in performance of steps of a method for predicting whether extending credit to a first party which lacks a credit history will result in a total loss to a second party that extends credit to the first party, the instructions causing the computer system to obtain a financial risk score for the first party by performing the following steps in order:
   collecting non-traditional data relating to the first party, wherein said non-traditional data is at least one selected from the group consisting of:
   publicly available data,
   demographic data,
   intelligent engine signals,
   deliver sequence files,
   velocity of data changes,
   velocity of historical inquiries pertaining to the first party, and
   address delivery data;
   accessing stored weights to be assigned to each item of non-traditional data;
   applying the assigned weight to each item of non-traditional data to generate weighted non-traditional data;
   processing the weighted non-traditional data to determine a score for each item of non-traditional data;
   adding the score for each item of non-traditional data to obtain a score total;
   adding the score total to a baseline score to obtain a financial risk score; and, after the risk score is obtained
   comparing the financial risk score to historical financial risk scores to obtain a risk class between 1 and 9 for the first party, wherein 1 represents the lowest risk of never paying and 9 represents the highest risk of never paying, to determine whether the first party has no ability or no intention to pay the second party and whether extending credit to the first party will result in a total loss to the second party, wherein total loss is defined as the first party having at least eighty percent of an outstanding credit balance associated with accounts that have non-decreasing balances for more than one hundred twenty one days past due in the payment history, and wherein said processor that performs the steps is able to predict the total loss to the second party which is otherwise not available because the first party lacks a credit history.

12. The storage medium of claim 11, further comprising instructions that cause the processor to perform the step of accessing a plurality of scorecards after the collecting step to compute the score total, wherein a scorecard is selected from the plurality of scorecards based on the type of commercial information data available.

13. The storage medium of claim 12, wherein the scorecard is based on whether the first party has or does not have trade data.

14. The storage medium of claim 13, wherein, if the first party has trade data, the scorecard is selected based on one of a, b and c, wherein:
   d. the trade data is detailed trade data and there is no prior severe delinquency;
   e. the trade data is thick trade data, and the first party has prior severe delinquency; and
   f. the trade data is thin trade data, and the first party has prior severe delinquency.

15. The storage medium of claim 14, wherein the trade data is thin trade data if there are one or two trades and the trade data is thick trade data if there are three or more trades.

\* \* \* \* \*